Patented Apr. 24, 1934

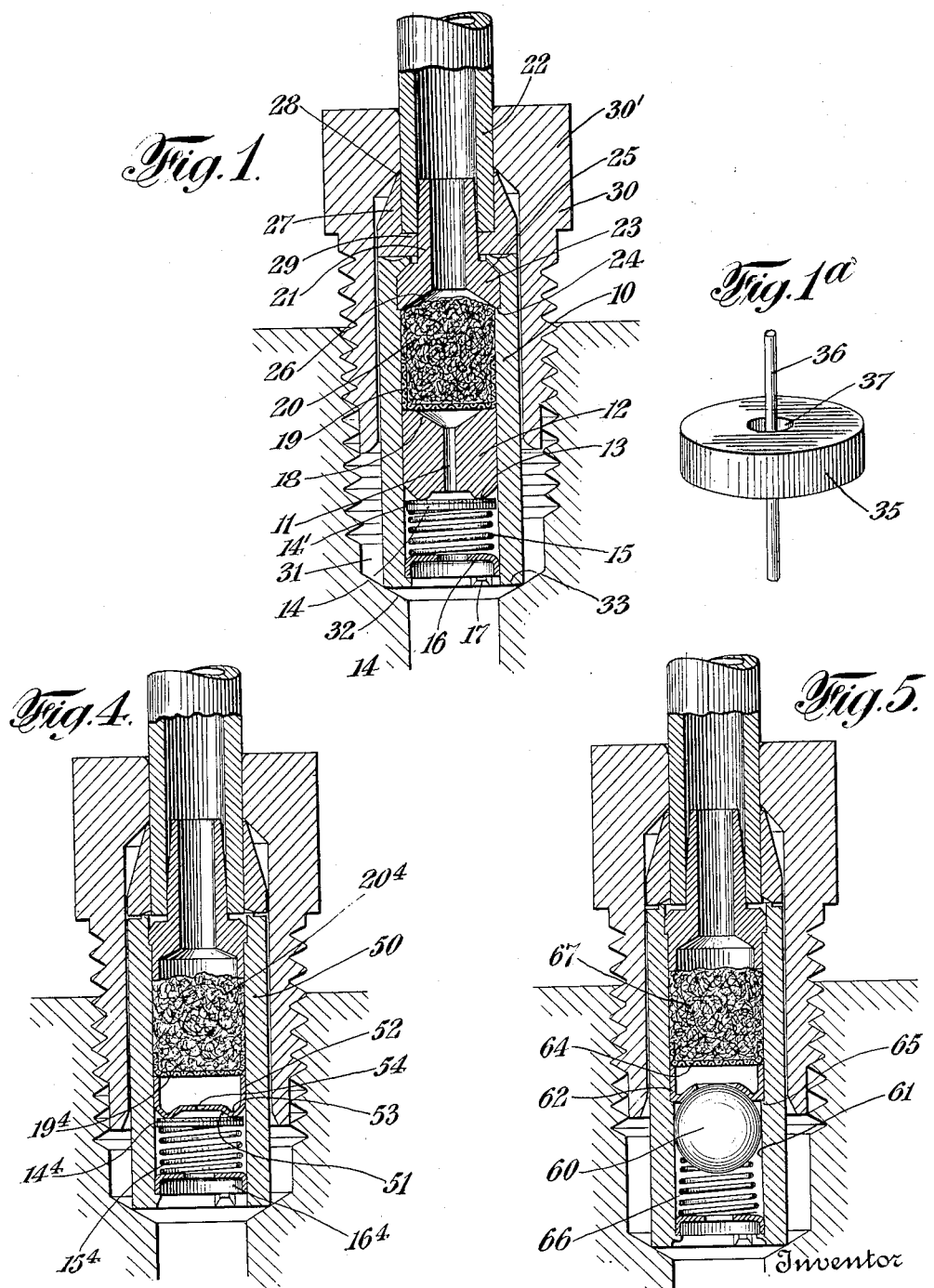

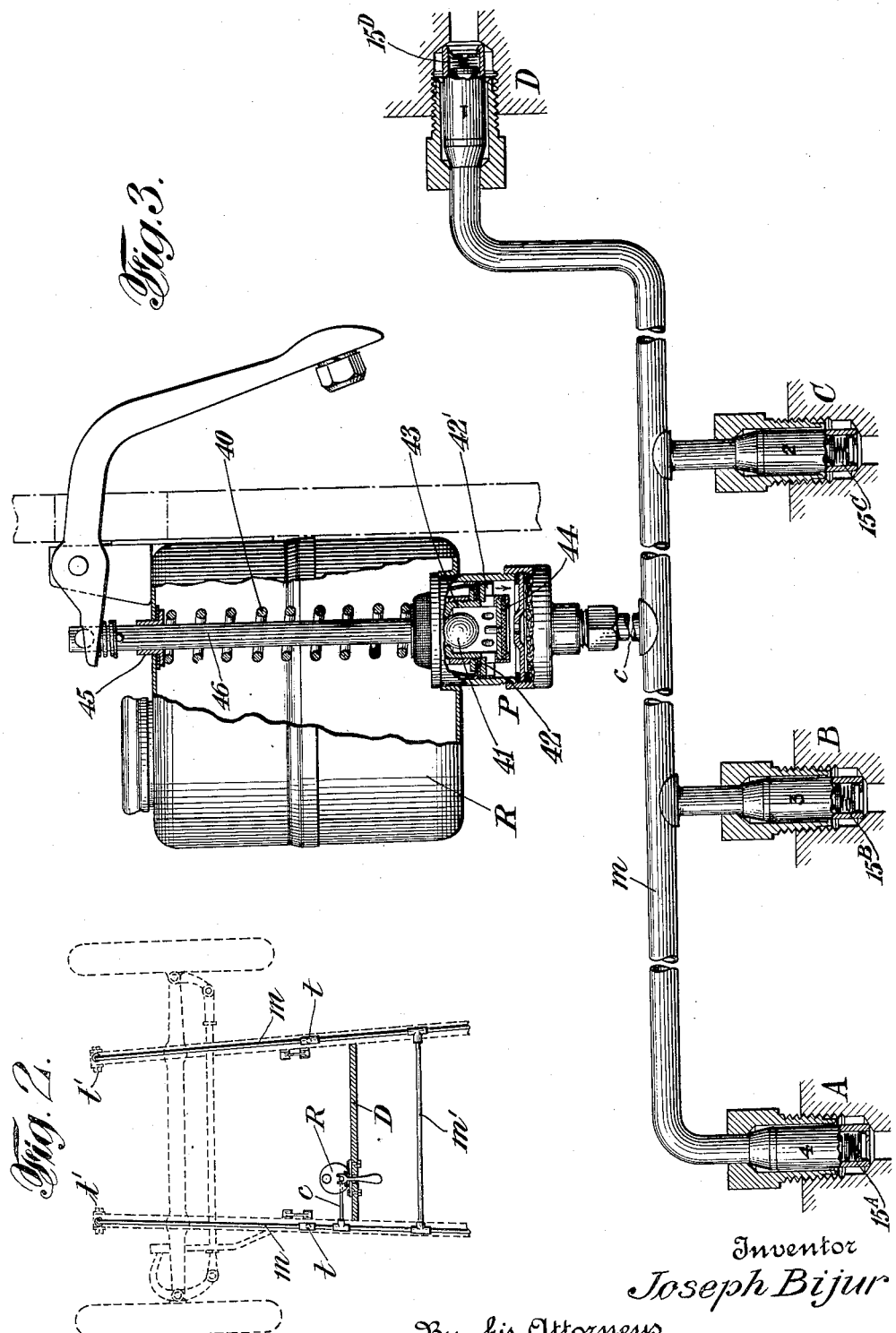

1,955,732

UNITED STATES PATENT OFFICE 1,955,732

LUBRICATING INSTALLATION AND APPARATUS

Joseph Bijur, New York, N. Y., assignor to Auto Research Corporation, a corporation of Delaware Application December 18, 1926, Serial No. 155,644

29 Claims. (Cl. 184—7)

My present invention is concerned with systems of the general type disclosed and claimed in the copending application, Serial No. 93,582, filed March 10th, 1926, now Patent No. 1,862,482 in which the outlet branches of a distributing piping system have pressure-responsive flow controlling fittings, which normally maintain the entire piping system filled with lubricant during the intervals between pump pressure operations exerted at the inlet of the system.

While the system of Patent 1,862,482, predetermines the relative rates of discharge at the various drip plugs, all of which emit for the same period of time, the system herein disclosed and specifically claimed, predetermines the relative time or period of discharge during any one operation of the system.

According to the present invention, the drip plug valves are maintained closed by graded pressures and the pump or other source of lubricant pressure at the inlet of the line exerts a systematically varying pressure during each discharge operation so as to maintain each valve open during an interval varying in approximately an inverse ratio with the strength of the corresponding spring.

In a preferred embodiment, the drip plugs have valves seated by coil springs of different pressures, and a pressure pump is employed provided with a discharging spring exerting an initial discharge pressure overcoming all of the valve springs, but which drops off rapidly as the stroke proceeds, to a minimum exceeding only that of the weakest of the valve springs.

While in general the flow controlling restriction of the various drip plugs used in my present system are identical, I may in certain relations, where a greater range of rates or discharge is desired, employ drip plugs such as those shown in Patent 1,862,482, with different instantaneous rates of discharge, in association with relief valve springs of various strengths, the strongest valve spring being in general associated with the drip plug of slowest rating.

While the system disclosed may operate with drip plugs of various constructions, I have disclosed and claimed certain drip plugs distinguished by cheapness of construction and compactness.

In the accompanying drawings in which are shown one or more of various possible embodiments of the several features of the invention, Fig. 1 is a longitudinal cross-section, showing one form of drip plug in assembled condition, Fig. 1a is a perspective view illustrating the method of making the restriction element of the drip plug of Fig. 1, Fig. 2 is a fragmentary diagrammatic view indicating the application of the installation for chassis lubrication, Fig. 3 is a diagrammatic view partly in section indicating a complete installation, Fig. 4 is a view similar to Fig. 1 of a form of drip plug alternative to that shown in Fig. 1, and;

Fig. 5 is a view similar to Figs. 1 and 4 of a further embodiment of drip plug.

In Fig. 1, I have shown a drip plug which includes a cartridge unit comprising a cartridge shell 10 having therein a minute flow controlling restriction, shown as a minute axial passageway 11 of accurately predetermined diameter, in a separate metal plug 12, friction-fitted into the cartridge.

The plug which is of soft metal such as lead-tin-antimony alloy, is preferably molded in a punch-pressing operation, so as to afford as an integral part thereof, the annular valve seat 13 for a valve 14 identical in construction with that of Patent 1,862,482. This valve, it is briefly noted, may comprise a disk with appropriate facing 14' of oil-silk which is urged against the preformed valve seat 13 by coil spring 15, reacting against a cup 16 held in place within the extremity of the cartridge by staking as at 17. The opposite end of the plug 12 is countersunk as at 18 to afford a stop at its rim only for the fine wire mesh backing 19 of the felt strainer plug 20, seated in the inlet end of the cartridge. An insert sleeve 21, preferably of steel, for the end of the supply pipe 22, ordinarily of copper or brass, constitutes a unitary part of the cartridge. For this purpose, the sleeve has an enlarged head 23 resting against a shoulder 24 within the cartridge, the outer part of which cartridge is swaged at 25 inward about the enlarged head 23. The inner end of the insert sleeve head 23 is countersunk as at 26, so as to clear the inlet end of the felt strainer, thereby to avoid compressing or reducing the effective area of the latter exposed to flow. A compression coupling sleeve 27 having a beveled outer edge 28 extends about the insert sleeve 21 and affords a bottoming rest at its inner flange 29, for the extremity of the lubricant supply pipe 22.

The drip plug is secured in position and a lubricant-tight connection thereto is effected by means of a bushing 30 threaded into a corresponding socket 31 in the supporting or bearing structure for the drip plug terminal, said bushing having a head 30' reacting against the extremity 28 of the compression coupling sleeve and forcing the latter inward upon the pipe 22. The hard metal insert sleeve prevents compression of the pipe under the clamping force exerted thereon by the threaded bushing.

As in Patent 1,862,482, the inner end of the socket 31 is beveled as at 32 so that only the outer edge 33 of the cartridge is pressed thereagainst, and this on a diameter considerably larger than that at which the threaded bushing 30 contacts the edge 28 of the compression sleeve. Accordingly, in tightening the threaded bushing, the inner end of the cartridge will be retained against rotation with greater force than that tending to rotate the compression sleeve, whereby there is no twisting tendency upon the pipe 22 in the process of tightening the compression joint.

The restriction plug 12 is preferably formed from an apertured slug 35 of lead alloy, shown at Fig. 1a, which is shaped to the form shown at 12, in the drawings by a stamping or a die operation, exerted by a punch press (not shown). The diameter of the hole or bore 11 is determined by inserting a hard metal wire 36 through the hole 37 of the slug 35, so that the metal of the soft slug will flow inward as it is compressed to tightly engage the wire which is then simply withdrawn, leaving the miniature passageway or bore 11 of precisely the diameter of the wire. By the operation described, I thus provide readily and at little cost, a bore of accurately predetermined diameter, which could be accomplished with difficulty, if at all, by a drilling operation. The lead plug is of thickness such that the bore will suffer no appreciable diminution of diameter when the plug is forced into the cartridge.

The drip plug units described are of general application to a system operating on the principle of that described and claimed in Patent 1,862,482 where a pump having a substantially constant discharge pressure is employed, and may be substituted for the drip plug shown in that application.

The drip plugs of different ratings would be produced by providing the bores 11 of different accurately predetermined diameters, employing corresponding wires 36 of different diameters in the process of making these plugs according to the method previously described. The restriction plug in a preferred embodiment may have a bore 11 of 3/16 inches in length and of diameter, depending on the relative rating of ten one thousandths to twenty one thousandths (.010 to .020) inches in diameter.

All of the drip plugs, regardless of rating being identical, except for the minute concealed bore 11 therein, the plugs are readily identified according to rating by a rating mark, as in my copending application, Serial No. 126,115 filed July 31st, 1926, which has become Patent No. 1,632,772, issued June 14, 1927.

The drip plug described is of short length, so that most of the length thereof may be disposed within the relatively shallow socket 31 in the mounting structure. The installed drip plug is completely concealed and protected. Only the threaded terminal bushing 30 is exposed, substantially as in the case of an ordinary pipe terminal devoid of a flow controlling instrumentality.

For a clearer understanding of the system, I have shown diagrammatically in Fig. 2, an automobile chassis lubricating installation embodying the drip plugs described. The lubricant supply unit is shown on the dashboard D and comprises an oil reservoir R with an associated pressure pump P, to the outlet of which is connected pipe c, which leads to one of the two mains m extending the length of the channel frames and in communication with each other through a cross pipe m'. Branches or taps t, a few only of which are indicated, lead from the mains to the various chassis bearings to be lubricated, such as the spring shackles and bolts, steering gear and other bearings. The outlet of each branch and the ends of the mains are provided with the drip plug terminals, which are applied each directly to the non-turning element of the bearing to be supplied therefrom. Pipes or conduits of suitable flexibility (not shown) may be employed to bridge from the mains, or from one of the mains, to mains on one or both of the axles and/or other parts that perform relatively large movements with respect to the frame in use of the vehicle, such as for instance, the steering knuckles and the brake rigging.

The outlet terminals t' are each preferably drip plugs of the construction shown in Fig. 1 and above described applied some at branches brazed onto the line, as best shown in Fig. 3, and others at the extremities of the line. The entire length of piping from the pump to each of the drip plugs is preferably of rigid small diameter seamless piping which is substantially non-dilatable under the operating pressures employed, and may be of uniform bore throughout.

In the system of Fig. 2 embodying the drip plugs of the construction set forth and shown in Fig. 1, as in that of Patent 1,862,482, the resistance to flow of each drip plug is such as in itself to be substantially controlling of the rate of emission therethrough under operating pressure, almost regardless of the resistance imposed by the entire length of pipe line and by the bearing. In each drip plug as heretofore suggested, the restriction bore, even that of the coarsest or fastest flowing drip plug is the preponderating and controlling element determining the rate of flow, its resistance being considerably greater than the combined resistance to flow of the relief valve and of the strainer plug thereof.

In Fig. 3 is shown diagrammatically a distributing system operating on a principle which though generically embraced within the scope of certain of the claims of my said copending application, Serial No. 124,566 filed July 24, 1926 which has become Patent No. 1,632,771, issued June 14, 1927, is specifically different therefrom.

The drip plugs, a few of which are shown at A, B, C and D, are each provided with a relief valve 14' similar to that shown in Fig. 1. The springs 15A, 15B, 15C and 15D respectively, seating said valves, are, however, not of substantially uniform strengths as in the copending application, but are of graded strengths. Thus, the springs may have seating pressures, such that the weakest spring, 15A, opens say at a pressure of approximately 12 pounds per square inch, the next weakest 15B at 24 pounds per square inch, and upward at intervals, say of 12 pounds per square inch, the spring 15D having maximum strength of 48 pounds per square inch.

For this system, a source of pressure or pump is required, which exerts a systematically varying rather than a constant discharge pressure. The pressure is so applied as to overcome the weakest of the valve springs throughout its duration, the strongest of the valve springs being maintained open for a minimum duration and the springs of intermediate strengths for intermediate durations.

In the specific embodiment shown in the drawings, I have illustrated a pump and reservoir assembly, similar in construction to that of Patent 1,862,482. The details thereof will be here set forth only insofar as they are material to an understanding of the invention claimed herein. The reservoir R is shown provided with a short pump cylinder P affixed in the bottom thereof and protruding therebelow. The piston 42 in the cylinder has suction cups 42' and has an opening for a valve cage 43 with a check valve 41 therein, said cage affording openings through which lubricant flows from the reservoir into the pump cylinder, which latter is normally closed by the end 44 of the piston structure. The assembly differs from that of the prior construction solely in the character of spring 40 employed to discharge the pump and seat the plunger. The spring is arranged to provide a greater range of pressure variation from fully stressed to expanded state. To this end, the spring has fewer turns and they are spaced farther apart than in the copending case. The upper end of spring 40 reacts against a bushing 45 through which the upper end of the piston rod 46 extends. The spring 40 is under but little stress in its most expanded state shown, to exert a piston seating pressure of but say 18 pounds per square inch just strong enough to overcome the weakest of the relief valve springs 15A, so that the pump piston will effectively discharge to the very end of its stroke. The maximum strength of the spring 40 in fully charged position is sufficient to overcome the strongest of the valve springs, that is, to exert an initial discharge pressure when the pump operating member is first released, of say 80 pounds per square inch.

I have illustratively shown in Fig. 4 a desirable form of drip plug for use with the system of Fig. 3. This drip plug includes a cartridge 50 similar to that of Fig. 1, but shorter. Within the cartridge, there is press-fitted a sheet metal member 51, formed as a cup with an upstanding wall 52, and embossed outwardly at 53 to provide a valve seat. The cup 51 has an extremely minute flow resisting aperture 54 therein, all of the drip plugs regardless of rating having the same size aperture. Against the valve seat 53 is pressed a disk valve $14^4$ identical with that of Fig. 1, urged against its seat by a coil spring $15^4$, which reacts against a press-fitted retaining cup $16^4$. The strainer plug $20^4$ is lodged within its fine wire mesh holding cup $19^4$, the latter of which bottoms against the upstanding wall 52 of the disk 51.

As in Fig. 2, the drip plugs are rated in accordance with the relative charges to be emitted therethrough. The rating is determined here solely by the strength of the relief valve spring $15^4$, the other parts of the drip plug including the restriction apertures 54 regardless of rating, being identical.

In operation, the stressed spring through the medium of the pump plunger immediately exerts a pressure which is transmitted throughout the lubricant-filled pipe system and is of magnitude such as to exert at each of the drip plug valves, a pressure sufficient to overcome the corresponding spring. Emission, accordingly, takes place through all of the drip plugs at substantially uniform rate, the resistance imposed by the various bores being in itself substantially controlling of the rate of discharge substantially regardless of the length of intervening pipe line and the resistance of the bearing. With a pump of the character shown in Patent 1,862,482, this operation would continue until the lubricant has all been discharged. However, in the preferred embodiment of the present invention, utilizing a pump as shown upon Fig. 3, as the pump strokes progresses, the strength of the discharge spring progressively diminishes until presently it is insufficient to overcome the resistance of the strongest valve seating spring or springs 15D on the line. The valves controlled by said springs, accordingly, close at that stage in the pump stroke while the emission continues through the remaining still open drip plugs. At successive stages of the progress of the pump discharge, the valves will close in the inverse order of the strengths of their springs, until finally near the end of the pump discharge stroke, the pressure due to the pump spring is sufficient to effect emission only through those drip plugs 15A, the valve seating springs of which are of minimum strength. At the end of the pump stroke the end of the piston seats and closes the outlet to prevent further emission and the weakest of the valve springs 15A also will close. The pipe line will, therefore, remain charged with oil during the intervals between successive pump operations, all of the drip plug valves being closed.

Thus, it will be seen that in pump discharge, those valves having the weakest springs remain open throughout the discharge, while those having the strongest of the springs remain open for the smallest portion of the discharge, the springs of various orders of intermediate strength remaining open for the corresponding intermediate periods.

In actual practice, it will be understood that the drip plugs are preferably all of identical construction except for the strength of the valve seating springs. Preferably the drip plugs are each provided with a rating mark, 1 indicating the drip plugs giving the smallest discharge, the rating 2 designates those plugs having the next higher rate of discharge and corresponding to the spring of next greater strength, etc.

Thus, in operation throughout pump discharge, all of the drip plugs emit at substantially the same rate determined by the minute restriction 54, but the durations of emission vary substantially inversely with the strength of the valve seating springs. The relative discharges through the drip plugs during one complete operation of the pump are governed by the time or period that the various valves are kept open, rather than by the absolute or relative instantaneous rates of emission.

In Fig. 5 is shown a construction of drip plug alternative to that shown in Fig. 4. According to this embodiment, the special flow retarding bore is eliminated, the valve accomplishing the restricting function by providing but a minute clearance therefor in the cartridge. Specifically, I have shown a preferred metal ball valve 60 fitting with but a minute clearance in the order of one thousandth (.001) inches in the cartridge bore 61. The valve seat is provided by the preformed face of a sheet metal cup 62, which may be friction-fitted in the cartridge, and preferably also bottoms against a shoulder 65 provided in the cartridge. The strainer plug 67 with its wire-mesh backing cup 64 rests against the rim of valve seat 62. The drip plugs are identical regardless of their rating, which is determined by the strength of the spring 66 that urges the valve 60 to its seat.

While I prefer to employ a spring discharged pump such as described, in executing the present system of operation, other propulsive means, manually actuated or automatic, may be employed for exerting the varying propulsive impulse required in this system of operation. While it is preferred initially to apply the maximum pressure and to allow the same to diminish as the pump discharge proceeds, it is understood that it is within the scope of the invention to cause the pressure to rise from a minimum and to effect a maximum pressure near the end of the pump discharge.

It will be understood that the drip plug shown in Fig. 1 or any of those embraced within the scope of my copending application, Serial No. 580,668 filed August 9, 1922, may be employed in the system shown in Fig. 3. For this purpose, the restriction apertures or plugs would all be of uniform bore or flow resisting effect, the variation being solely in the valve seating springs as heretofore pointed out.

Where a greater range of rates or quantities of flow through the various fittings is desired, on a single system of the general character set forth, that is, where the fastest of the drip plugs is to feed more than 6 or 7 times as fast as the slowest, I prefer to employ drip plugs such as that disclosed in Fig. 1, or in the copending applications above referred to with their restriction bores 11 rated according to flow, which are equipped, however, with the time controlling relief valve springs previously described. Thus, there might be employed with each of say five or six different ratings of flow restrictions, different strengths of relief valve springs, the strongest springs being associated with the slowest drip plugs, and the weakest spring with the fastest.

By thus superposing the control by both instantaneous rate and duration, I accomplish a wider range of relative charge emitted, and these are controlled to a degree of accuracy, which could be accomplished were the regulation of but one of these determining factors availed of, only by a precision of workmanship not readily attainable in ordinary manufacturing practice. Each of the drip plugs would bear its appropriate rating mark, so that the drip plug desired for any particular rating can be readily selected and installed without the need for any adjusting operation whatsoever.

It is, of course, understood that the system and the fittings herein claimed, though well suited for chassis lubrication, have a far wider field of application.

I claim:

1. A centralized pressure distributing conduit system having a plurality of outlets, a plurality of pressure responsive flow controlling means at said outlets of different ratings arranged in multiple, the rating of each of said means depending upon the minimum pressure required to cause emission from the outlet controlled by said means, said system having at its inlet a source of pressure varying systematically to evolve at said outlets pressure varying between the limits of said minimum pressures.

2. A centralized pressure distributing installation comprising a piping system having a plurality of pressure responsive flow controlling outlet fitting of different ratings arranged in multiple, said system including means to prevent escape of liquid through the outlets during the intervals between pressure applications, the rating of each outlet fitting depending upon the minimum pressure required to cause emission from its associated outlet, said system having at its inlet a source of pressure varying systematically to evolve at said outlets pressure varying between the limits of said minimum pressures.

3. A centralized pressure distributing system having an inlet, a plurality of widely distributed flow controlling outlet fittings of different ratings arranged in multiple, each of said outlet fittings presenting a resistance to flow high compared to that of the length of pipe line intervening between the same and the inlet, each of said outlet fittings including a pressure responsive element normally preventing exit of liquid therefrom, the rating of each fitting depending upon the minimum pressure at which the pressure responsive element thereof will yield in order to permit flow, said system having at its inlet a source of pressure varying systematically between the limits of said minimum pressures.

4. A central pressure lubricating system comprising a piping system having an inlet and a plurality of outlet fittings controlling flow to the parts to be lubricated, each of said fittings being constructed and arranged for emission from its corresponding outlet while a predetermined pressure in the system is exceeded, said fittings responding to different pressures depending on the requirements of the corresponding bearings and means for applying a systematically varying pressure at said inlet, whereby each of the outlets will emit only during that part of the period of pressure application when the pressure is sufficient to cause response of the corresponding outlet fitting.

5. A central lubricating system comprising a piping system having an inlet and a plurality of outlets, each of said outlets having closure means responding to pressure transmitted from said source to open and emit to the corresponding bearing, the pressure to which each closure responds depending in an inverse ratio upon the lubricant requirement for the corresponding bearing, and means for applying a systematically varying pressure at the source whereby each of the outlets will remain open during a fraction of the period of pressure application depending on the requirements of the corresponding bearing.

6. A centralized lubricating system comprising a pipe line having branches leading to the various bearings, each of said branches having a control fitting having a valve, and a spring normally seating said valve to prevent emission therethrough, the rating of said fittings depending upon the seating pressure of the valve springs, said system having at its inlet a source of systematically varying pressure whereby each control fitting will emit only during the interval that the pressure transmitted from the source overcomes the corresponding valve spring.

7. A centralized lubricating system comprising a pipe line having a plurality of branches, each provided with a control fitting, each of said fittings including a spring seated relief valve, the seating springs of various valves having different strengths, those of the fittings open for the greatest duration being weakest, said system having at its inlet a source of systematically varying pressure, each of said control fittings including an enclosed fixed resistance exerting a flow retarding effect high compared to that incurred in the rest of the pipe line.

8. A centralized lubricating system comprising a pipe line having a plurality of branches each provided with a control fitting, each of said fittings including a spring-seated relief valve, the seating springs of various valves having different strengths, those of the fittings to be open for the maximum duration being weakest, said system having at its inlet a source of systematically varying pressure, each of said control fittings including a member therein having a minute aperture therethrough, each of said apertures imposing a flow resistance high compared to that in the rest of the pipe line.

9. A central lubricating system comprising a piping system having a plurality of outlet branches, control fittings in said branches having springs of graded strengths, normally preventing emission from the piping system, and a spring actuated lubricant propulsive member at the inlet to the pipe system of initial strength sufficient to overcome all of the control fitting springs and of strength toward the end of its propulsion sufficient to overcome only the least resistant of said springs.

10. A lubricating installation comprising a source of pressure, a pipe line supplied therefrom and having a plurality of distributed outlets, flow control devices determining the emission to the various bearings, each of said devices having a spring-seated valve normally closed, the strength of each of said valve springs being inversely proportional to the lubricant requirement of the corresponding bearing, and a source of pressure at the inlet to the pipe system exerting a progressively varying pressure which at its maximum exceeds the seating pressure of all of said valves and at one stage of its operation exceeds the seating pressure of only the weakest of said springs, whereby the period of emission through each of said outlets will vary in an inverse ratio with the strength of the corresponding valve spring.

11. A central lubricating installation comprising a source of pressure, a pipe line supplied therefrom and having a plurality of distributed outlet devices controlling the emission to the various bearings, each of said devices having a spring-seated valve normally closed, and means at the inlet to the pipe system exerting a progressively varying pressure which at its maximum exceeds the seating pressure of all of said valves and at one stage of its operation exceeds the seating pressure of only the weakest of said springs, whereby the period of emission through each of said outlets will vary in an inverse ratio with the strength of the corresponding valve spring, all of said outlet devices in open position offering a resistance to flow such as to effect substantially identical rates of emission at any instant under the operating pressure.

12. A lubricating system comprising a pipe line, means maintaining said line filled with lubricant, means for injecting a predetermined charge into the inlet of the pipe line under a progressively varying pressure, and control outlets of different ratings on said pipe line each responsive to a definite pressure within the range of pressure transmitted from the inlet.

13. A central lubricating system including a pipe line having an inlet and a plurality of branches leading to the bearings to be supplied, control devices in said branches, each of said devices having a spring seated valve, the seating spring of each device being of rated strength in accordance with the charge of lubricant required at the corresponding bearings, means for injecting a definite charge into the inlet of the system under a progressively varying pressure which at its maximum maintains all of said valves open and which at one stage of its operation maintains only the weakest of said valves open, and flow resisting means associated with each of said devices to assure similar rates of emission through the various devices at all stages of the emission therefrom.

14. A central lubricating system including a piping system having an inlet and a plurality of branches leading to the various bearings, control devices in said various branches provided with uniform flow restriction means to assure substantially uniform relative rates of emission therefrom at any instant under operating pressure, each of said devices having a valve, each valve seated by a spring of a definitely rated strength corresponding to the charge of lubricant required for the associated bearing, a plunger pump at the inlet of the system for injecting a predetermined charge thereinto, said pump exerting a pressure varying progressively from one end to the other of the pump stroke, said pump exerting maximum pressure at one end of its stroke, of magnitude to overcome the strongest of the valve seating springs whereby the devices having the weakest valve seating springs will remain open throughout the pump stroke and those having the strongest valve springs will remain open for a minimum period during the pump discharge stroke.

15. A central pressure lubricating system including a pipe line having an inlet and having branches leading to various bearings, valves in said various branches, springs normally seating said valves to maintain the pipe line filled with lubricant, said springs having different strengths in accordance with the requirements of the corresponding bearings, a pressure pump at the inlet to the piping system to inject a definite charge thereinto, said pump exerting a maximum pressure at the beginning of discharge, of magnitude such as to open all of the valves on the system, the pressure due to said pump diminishing progressively as the pump stroke proceeds to values such as to permit the valve springs of different ratings to successively seat the corresponding valves, those valves with springs of weakest rating being seated last.

16. A centralized lubricating system including a pipe line having a plurality of outlet branches, springs seated relief valves in the various branches, normally closed to maintain the system filled, each spring being of strength inversely proportional to the duration of lubricant emission through the corresponding branch, and a spring discharged pump at the inlet to the pipe system exerting a maximum discharge pressure at the beginning of its stroke overcoming all of the relief valve springs and gradually weakening as the pump stroke is executed to permit successive closure of the progressively weaker groups of relief valve springs in the system, the pump spring near the end of the pump stroke being of strength sufficient to overcome only the weakest of the relief valve springs.

17. A central lubricating system including a pipe line having an inlet and a plurality of widely distributed outlet branches leading to the various bearings to be supplied with lubricant, outlet fittings at the various branches, all of said fittings having uniform restrictions to effect equal rates of emission substantially regardless of the distance from the source of pressure, each of said outlets having a spring-seated valve whereby the piping system is normally maintained filled with lubricant, the spring of each of said valves exerting a seating pressure rated in accordance with the lubricant requirement of the corresponding bearing, the spring of weakest rating corresponding to the bearing requiring the most lubricant, and a pressure pump at the inlet having a discharging spring exerting a maximum pressure at the beginning of its stroke of magnitude substantially greater than that of the strongest valve seating spring, the pressure due to said discharge spring diminishing progressively during the stroke of the pump to permit successive closing of the valves of various spring ratings.

18. A central lubricating system including a pipe line having an inlet and provided with a plurality of widely distributed branches leading to the various bearings, each of said branches having a flow controlling outlet fitting, all said fittings having uniform restrictions therein of flow retarding effect, such as to effect equal rates of emission under any given operating pressure, each of said fittings having a valve therein, springs normally closing said valves and thereby maintaining the piping system filled with lubricant, said springs of strength ratings depending on the amount of lubricant required at the corresponding bearings, and a spring discharged pressure pump at the inlet to the piping system exerting an initial discharge pressure overcoming the springs of all of the valves and progressively decreasing during the execution of the pump discharge stroke, the strength of the pump spring near the end of the discharge stroke being such that emission from the line then takes place through only fittings having the weakest seating springs.

19. A centralized lubricating system including a pipe line having a plurality of outlet branches, spring seated relief valves in the various branches, normally closed to maintain the system filled, each spring being of strength inversely proportional to the charge of lubricant to be emitted through the corresponding branch, and a spring discharged pump at the inlet to the pipe system exerting a maximum discharge pressure at the beginning of its stroke, overcoming all of the relief valve springs and gradually weakening as the pump stroke is executed to permit successive closure of the progressively weaker groups of relief valve springs, the pump spring near the end of the pump stroke being of strength sufficient to overcome only the weakest of the relief valve springs, the end of the pump plunger being urged by the pump discharge spring against the inlet to the pipe line when the pump stroke is completed.

20. A centralized lubricating system including a pipe line having a plurality of outlet branches, spring seated relief valve in said branches normally closed to maintain the system filled, each spring being of strength inversely proportional to the charge of lubricant to be emitted through the corresponding branch, and a spring discharged pump at the inlet to the pipe system exerting a maximum discharge pressure at the beginning of its stroke overcoming all of the relief valve springs and gradually weakening as the pump stroke is executed to permit successive closure of the progressively weaker groups of relief valve springs, the pump spring near the end of the pump stroke being of strength sufficient to overcome only the weakest of the relief valve springs, the pump having an associated reservoir from which it derives its charge, the pump piston at the end of the stroke being seated by the pump discharge spring to seal the communication from the reservoir to the inlet of the pipe line.

21. A centralized pressure lubricant distributing installation for a mechanism having a plurality of spaced bearings, said installation including a central source of lubricant pressure, a branched conduit system with an inlet from said source and with a plurality of outlets to the bearings of said mechanism to be lubricated, each of said outlets including a flow controlling fitting, each fitting having means therein of invariant flow resisting effect, all of said fittings including identical relief valves, each of said valves having a seating spring, the pressures of the springs of the various fittings differing in accordance with the rating of the fitting, each fitting having an exposed designation corresponding to its relative rating, whereby the drip plugs may be readily selected and installed on a chassis, each at a place corresponding to its rating designation, and each drip plug will without adjustment feed its correct proportion of lubricant under pressure from a common source, said source of pressure giving rise to a pressure which changes from the beginning to the end of the pressure application over the entire range necessary for opening the different valves.

22. A centralized lubricating system comprising a pipe line having branches leading to the various bearings, each of said branches being provided with a control fitting having a valve, a spring normally seating said valve to prevent emission therethrough, the springs of various valves having different seating pressures the relative ratings of the fittings depending upon said pressures, said system having at its inlet a source of systematically varying pressure whereby each control fitting will emit only during the interval that the pressure transmitted from the source overcomes the corresponding valve spring, each valve extending with clearance so minute in the bore of its fitting as to afford an outlet crevice of flow resistance high compared to that of the rest of the pipe line.

23. A central lubricating system including a pipe line having an inlet and a plurality of branches leading to the bearings to be supplied, control devices in said branches, each of said devices having a spring seated valve, the seating spring of each device being of rated strength in accordance with the charge of lubricant required at the corresponding bearing, means for injecting a definite charge into the inlet of the system under a progressively varying pressure which at its maximum maintains all of said valves open and which at one stage of its operation maintains only the weakest of said valves open, and flow resisting means associated with each of said devices to assure definite relative rates of emission through the various devices at all stages of the emission therefrom.

24. A centralized pressure lubricant distributing installation for a mechanism having a plurality of spaced bearings, said installation including a central source of lubricant pressure, a branched conduit system with an inlet from said source and with a plurality of outlets to the bearings of said mechanism to be lubricated, each of said outlets including a flow controlling fitting, each fitting having restriction means thereon of invariant flow resisting effect, various elements of the set having restrictions of different magnitude to determine different rates of emission, all of said fittings including identical relief valves, each of said valves having a seating spring, the pressures of the springs of the various fittings differing, each drip plug having a valve spring the strength of which is in direct ratio with the resisting effect of its restriction, each fitting having an exposed designation corresponding to the quantity of liquid which it will emit, whereby the drip plugs may be readily selected and installed in accordance with the charges required at selected places and each drip plug will without adjustment feed its correct proportion of liquid under pressure from a common source, said source of pressure giving rise to a pressure which changes from the beginning to the end of the pressure application over the entire range necessary for opening the different valves.

25. A centralized pressure lubricant distributing installation for a mechanism having a plurality of spaced bearings, said installation including a central source of lubricant pressure, a branched conduit system with an inlet from said source and with a plurality of outlets to the bearings of said mechanism to be lubricated, each of said outlets including a flow controlling fitting, all of said fittings including identical relief valves, each of said valves having a seating spring, the pressures of the springs of the various fittings differing in accordance with the relative periods of emission desired through the drip plugs at instantaneous rate determined by the restricted passage thereof, each fitting having an exposed designation corresponding to the relative quantity of liquid which it will emit, whereby the drip plugs may be readily selected and installed in accordance with the charges required at selected places and each drip plug will without adjustment feed its correct proportion of liquid under pressure from a common source, said source of pressure giving rise to a pressure which changes from the beginning to the end of the pressure application over the entire range necessary for opening the different valves.

26. A centralized pressure distributing system having a plurality of pressure responsive flow controlling outlets of different ratings arranged in multiple, each of said outlets including an accurately predetermined flow controlling resistance, each of said outlets also including a spring seated valve normally closed to prevent emission of liquid therefrom, the seating pressures of said springs differing in accordance with the diverse charges desired through the various outlets, said system having at its inlet, a source of pressure which gives rise to a pressure which changes from the beginning to the ending of the pressure application from said source to the outlets, said pressure varying over the entire range necessary for opening the different valves.

27. A centralized pressure distributing system having a plurality of pressure responsive flow controlling outlets of different ratings arranged in multiple, each of said outlets including an accurately predetermined flow controlling resistance, each of said outlets also including a spring seated valve normally closed to prevent emission of liquid therefrom, the seating pressures of said spring differing in accordance with the diverse charges desired through the various outlets, said system having at its inlet, a source of pressure which gives rise to a pressure which changes from the beginning to the ending of the pressure application from said source to the outlets, said pressure varying over the entire range necessary for opening the different valves, the different outlets having flow controlling resistances of different values, the greatest resistances being associated with the outlets having the valve springs of maximum strength, the resistances of least value being greater than that of the greatest length of pipe line intervening between the source of pressure and an outlet.

28. A centralized pressure distributing system having a plurality of pressure responsive flow controlling outlets of different ratings arranged in multiple, each of said outlets including an accurately predetermined flow controlling resistance, each of said outlets also including a spring seated valve normally closed to prevent emission of liquid therefrom, the seating pressures of said springs differing in accordance with the diverse charges desired through the various outlets, said system having at its inlet a source of pressure which gives rise to a pressure which changes from the beginning to the ending of the pressure application from said source to the outlets, said pressure varying over the entire range necessary for opening the different valves, the different outlets being in sets similar in their flow controlling resistances to determine different instantaneous rates of discharge, and the members of each set of outlets having valve seating springs of different strengths to determine different durations of discharge.

29. A centralized pressure distributing system having a plurality of pressure responsive flow controlling outlets of different ratings arranged in multiple, each of said outlets including an accurately predetermined flow controlling resistance, each of said outlets also including a spring seated valve normally closed to prevent emission of liquid therefrom, the seating pressures of said springs differing in accordance with the diverse charges desired through the various outlets, said system having at its inlet a source of pressure which gives rise to a pressure which changes from the beginning to the ending of the pressure application from said source to the outlets, said pressure varying over the entire range necessary for opening the different valves, the different outlets being in sets differing in their flow controlling resistances to determine different instantaneous rates of discharge, and the members of each set of outlets having valve seating springs of different strengths to determine different durations of discharge.

JOSEPH BIJUR.